United States Patent
Wood et al.

(10) Patent No.: US 9,124,943 B2
(45) Date of Patent: *Sep. 1, 2015

(54) SYSTEM FOR PROVISIONING MEDIA SERVICES

(71) Applicant: AT&T Intellectual Property I, LP, Atlanta, GA (US)

(72) Inventors: Catherine Wood, Chicago, IL (US); Daniel P. Malee, Wheaton, IL (US); Jeffrey Dicks, Chicago, IL (US); Michael Everett, O Fallon, MO (US); Srinidhi Venkata Subbarao, Rolling Meadows, IL (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,869

(22) Filed: Jan. 6, 2014

(65) Prior Publication Data

US 2014/0123167 A1 May 1, 2014

Related U.S. Application Data

(63) Continuation of application No. 11/620,751, filed on Jan. 8, 2007, now Pat. No. 8,650,589.

(51) Int. Cl.
| | |
|---|---|
| H04N 7/16 | (2011.01) |
| H04N 7/173 | (2011.01) |
| H04N 21/6334 | (2011.01) |
| H04N 21/258 | (2011.01) |
| H04N 21/426 | (2011.01) |
| H04N 21/443 | (2011.01) |
| H04N 21/643 | (2011.01) |

(52) U.S. Cl.
CPC ....... *H04N 21/6334* (2013.01); *H04N 7/17318* (2013.01); *H04N 21/25816* (2013.01); *H04N 21/42684* (2013.01); *H04N 21/4432* (2013.01); *H04N 21/64322* (2013.01)

(58) Field of Classification Search
USPC ............... 725/25, 30, 46, 100, 110, 131, 132, 725/139, 140, 40; 713/169, 175–176; 380/285
See application file for complete search history.

(56) References Cited

U.S. PATENT DOCUMENTS

| | | | |
|---|---|---|---|
| 6,188,684 B1 | 2/2001 | Setoyama et al. | |
| 6,957,276 B1 * | 10/2005 | Bahl | ............................. 709/245 |
| 7,231,516 B1 | 6/2007 | Sparrell et al. | |
| 7,266,090 B2 * | 9/2007 | Sawada et al. | ................ 370/254 |

(Continued)

*Primary Examiner* — Mulugeta Mengesha

(74) *Attorney, Agent, or Firm* — Guntin & Gust, PLC; Joseph Hrutka

(57) ABSTRACT

A system for monitoring order fulfillment of telecommunication services is disclosed. An apparatus that incorporates teachings of the present disclosure may include, for example, a monitoring system having a controller element that submits a correlation ID to a service orchestration system (SOS) that manages one or more order fulfillment systems (OFSs) that collectively fulfill a select one of a plurality of telecommunication service orders according to a plurality of intermediate fulfillment steps, receives from the SOS information associated with the plurality of intermediate fulfillment steps tagged with the correlation ID, records said information according to the correlation ID, and collects correlated fulfillment activity for the plurality of telecommunication service orders from a plurality of iterations of the foregoing steps. Additional embodiments are disclosed.

20 Claims, 3 Drawing Sheets

(56) References Cited

U.S. PATENT DOCUMENTS

| | | |
|---|---|---|
| 7,295,543 B2 | 11/2007 | Kikuchi et al. |
| 7,631,325 B2 * | 12/2009 | Rys et al. .................. 725/25 |
| 7,730,527 B2 | 6/2010 | Charles et al. |
| 8,181,262 B2 | 5/2012 | Cooper et al. |
| 8,213,934 B2 * | 7/2012 | Tsirtsis et al. ............ 455/435.1 |
| 2002/0019984 A1 | 2/2002 | Rakib |
| 2003/0048380 A1 | 3/2003 | Tamura |
| 2004/0153667 A1 * | 8/2004 | Kastelewicz et al. ......... 713/201 |
| 2004/0268420 A1 | 12/2004 | Addington et al. |
| 2006/0051059 A1 | 3/2006 | Krakirian et al. |
| 2007/0016658 A1 | 1/2007 | Moineau et al. |
| 2007/0079368 A1 | 4/2007 | Takeyoshi et al. |
| 2009/0113073 A1 | 4/2009 | Koide et al. |
| 2010/0241570 A1 | 9/2010 | Keresman, III et al. |
| 2012/0240207 A1 * | 9/2012 | Kato .............................. 726/7 |

* cited by examiner

SYSTEM FOR PROVISIONING MEDIA SERVICES

CROSS-REFERENCE TO RELATED APPLICATIONS

This application is a continuation of U.S. patent application Ser. No. 11/620,751 filed Jan. 8, 2007 which is incorporated herein by reference in its entirety.

FIELD OF THE DISCLOSURE

The present disclosure relates generally to media services, and more specifically to a system for provisioning media services.

BACKGROUND

Deployment of Set-Top Boxes (STBs) in residences and commercial enterprises to enable presentation of media services on one or more media devices such as a plasma TV, a desktop computer or otherwise requires tedious installation for field technicians. Usually, a field technician needs to perform a number of provisioning steps to enable media services on an STB. The time spent to install such devices can be time consuming and costly to service providers.

A need therefore arises for a system for provisioning media services.

DETAILED DESCRIPTION

Embodiments in accordance with the present disclosure provide a system for provisioning media services.

In a first embodiment of the present disclosure, a computer-readable storage medium in a Set-Top Box (STB) can have computer instructions for receiving an identifier from a Residential Gateway (RG), submitting the identifier of the RG and a certificate of the STB to an IPTV system, and receiving from the IPTV system provisioning information for enabling presentation of IPTV services at a media device upon authenticating the STB according to the identifier of the RG and the certificate of the STB.

In a second embodiment of the present disclosure, a Service Startup System (SSS), comprising a controller element that receives from an STB an identifier of an RG, and a certificate associated with the STB for authenticating the STB and for provisioning the STB to receive media services.

In a third embodiment of the present disclosure, a service orchestration system (SOS) can have a controller element that receives from a computing device a request for provisioning information for an STB according to an identifier of an RG and a certificate identifying the STB, and submits said provisioning information to the computing device for provisioning said STB to enable presentation of media services.

In a fourth embodiment of the present disclosure, a media device can have a controller element that receives media services from an STB enabled to deliver said media services upon being authenticated and provisioned according to a certificate that identifies the STB and an identifier of an RG.

In a fifth embodiment of the present disclosure, an authentication system can have a controller element that authenticates an STB according to a certificate that identifies the STB and an identifier of an RG, each supplied by the STB.

Figure 1:
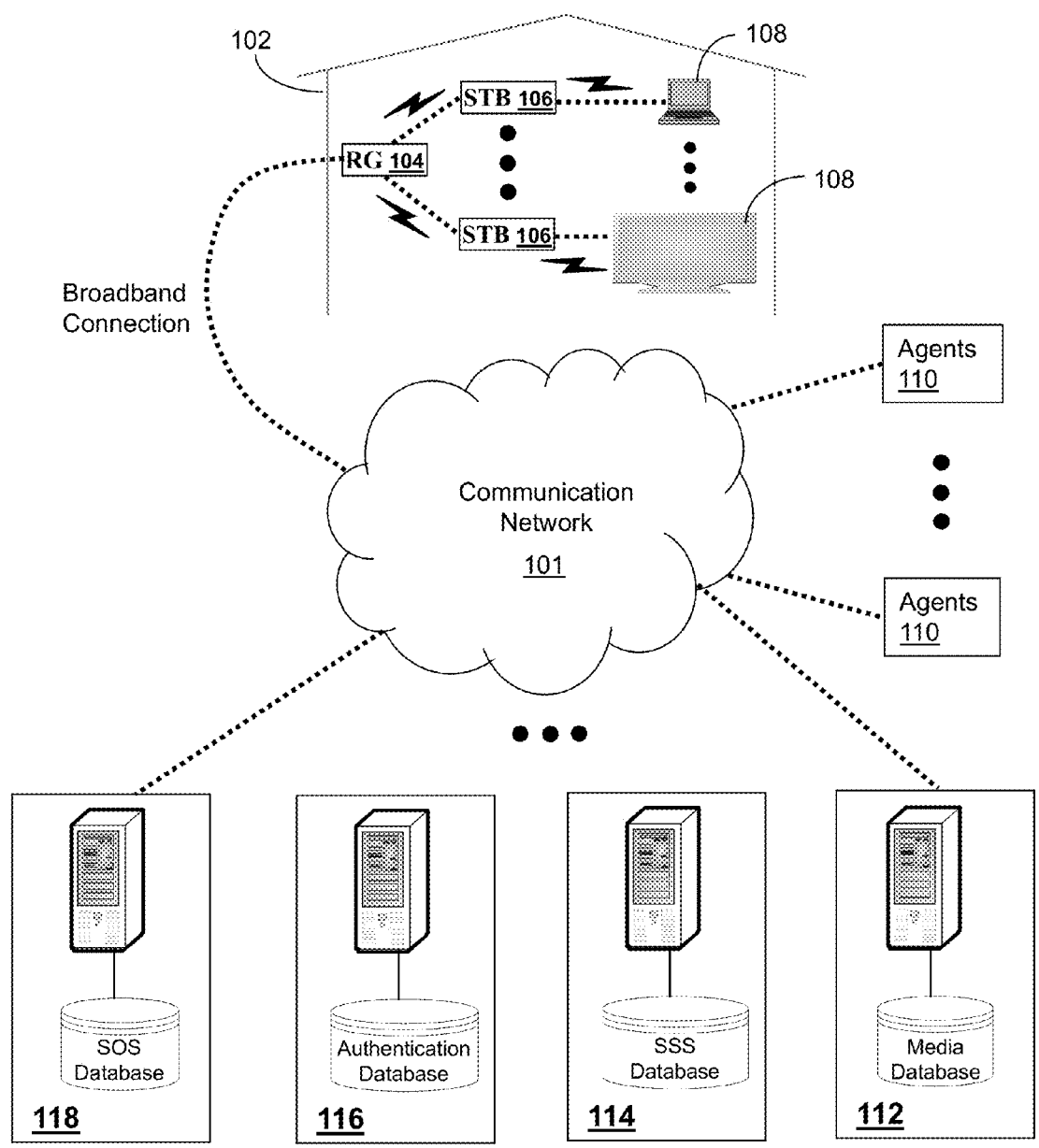
FIG. 1 depicts an exemplary embodiment of a communication system.

FIG. 1 depicts an exemplary embodiment of a communication system 100. The communication system 100 can comprise a media system 112, a Service Startup System (SSS) 114, an authentication system 116 and a Service Orchestration System (SOS) 118 coupled to a communication network 101 having common network elements that support wireline and/or wireless packet and/or circuit switched communication access technologies (e.g., PSTN, cable, xDSL, Ethernet, CDMA, GSM, Software Defined Radio, Ultra Wide Band, WiMax, etc.).

The media system 112 can represent an analog multimedia service system and/or digital multimedia service system such as presented by satellite, cable, and telecommunication service providers. Multimedia services can include without limitation voice, moving images (e.g., high definition, standard or streaming video), still images (e.g., JPEGs), audio entertainment (e.g., MP3, or streaming audio), or any form of data services. A portion of digital multimedia services can be presented by way of a common IPTV system which can deliver television and/or video signals distributed to consumers by way of a broadband connection to a residence or commercial establishment ("property") 102 as shown in FIG. 1. The property 102 can include a common residential gateway (RG) 104 that exchanges unicast or multicast signals with the media system 112 over the communication network 101 and distributes a portion of said signals to one or more Set-Top Boxes (STBs) 106 used for presenting multimedia services to a media device 108 such as a computer, or analog or digital television (e.g., plasma TV).

To assist in the installation of STBs 106 at the property 102, the media system 112 can direct installation requests to the SSS 114, the authentication system 116, and the SOS 118. Systems 114, 116 and 118 can operate independently from the media system 112, or can be combined with one another and the media system 112. Accordingly the media system 112 and said systems 114, 116 and 118 can be centralized or decentralized (as shown in FIG. 1) without departure from the scope of the present disclosure.

Figure 2:
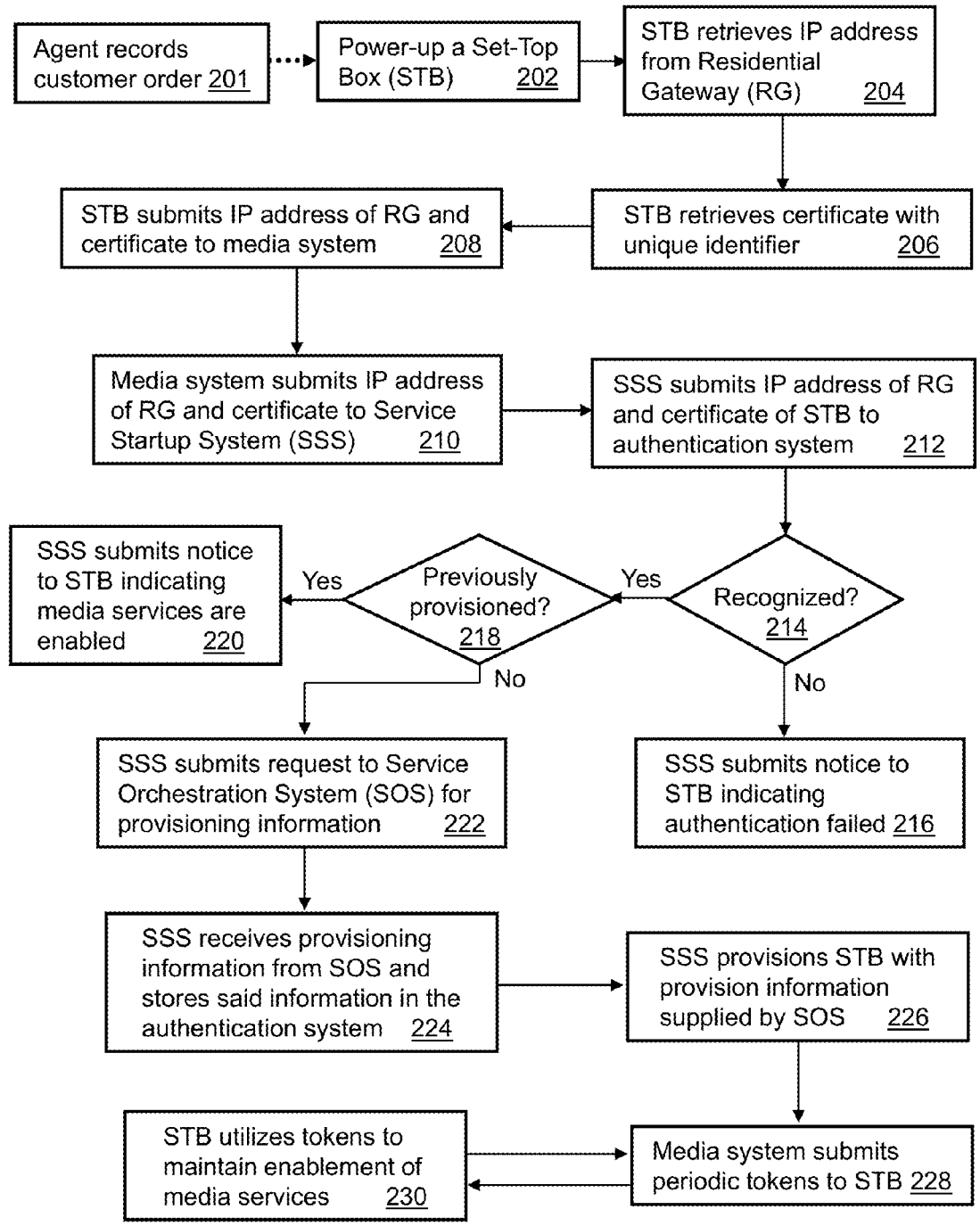
FIG. 2 depicts an exemplary method operating in portions of the communication system.

With these principles in mind, FIG. 2 depicts an exemplary method 200 operating in portions of the communication system 100. Method 200 begins with step 201 in which an agent 110 creates a media services order (MSO) directed by a customer desiring to install multimedia services in property 102. The MSO is recorded and processed by the SOS 118 which orchestrates provisioning of said service at a time when installation of an STB 106 takes place. Once the MSO is entered, a field technician is also assigned to deliver one or more STBs 106 to the requesting customer. Alternatively, the customer can be asked to pick up the STBs 106, or said STBs 106 can be delivered by a courier. Once the STBs 106 have arrived, they are installed to a common broadband connection (e.g., cable, xDSL, or fiber) in the property 102 and powered up in step 202.

After the STB 106 has completed a power cycle, it proceeds to step 204 where it retrieves a static IP address from the RG 104 in the property 102. The RG 104 is assigned the static IP address by the SOS 118 or other suitable system at the time of installation in the property. The SOS 118 associates the static IP address with the location of the property 102 to track the location of the RG 102. Accordingly, the static IP address supplied by a requesting STB 106 serves to locate the STB relative to the property 102. Alternatively or in combination, the STB 106 can be programmed to retrieve the MAC address of the RG 104. The MAC address is also a unique identifier for the RG 104 which can be stored in the SOS 118 and associated with the property 102.

In step 206, the STB 106 can further retrieve a Public Key Infrastructure (PKI) certificate that includes a unique identifier of the STB. The unique identifier can be an alphanumeric character sequence created by the manufacturer of the STB 106 or provided by the service provider of the media system 112. To avoid identity theft, the alphanumeric sequence can be a unique identifier created for the STB 106 that cannot be readily disclosed by viewing or tampering with the STB unit. Alternatively or in combination, the MAC address of the STB 106 can be included in the PKI certificate. However, in this latter embodiment if the MAC address is exposed by the housing assembly of the STB 106, tampering may be more likely. The PKI certificate including either of these embodiments utilizes common encryption technology to minimize a possibility of identity theft.

In step 208, the STB 106 submits the IP address of the RG 104 and the certificate of the STB to the media system 112. The media system 112 in step 210 submits said identifiers to the SSS 114 to perform authentication and if necessary provisioning of the requesting STB 106. The SSS 114 in step 212 submits the identifiers to the authentication system 116. The authentication system 116 can utilize a common authentication protocol such as AAA (Authentication, Authorization and Accounting) to perform an authentication process. For ease of storage and rapid retrieval, the authentication system 116 can store authentication information associated with an STB 106 according to a Lightweight Directory Access Protocol (LDAP). In the case of un-provisioned STBs 106, the authentication system 116 can be programmed to initially store a complementary copy of the certificate of each STB without related customer information. Storage of this certificate can take place at the time that the STB 106 is manufactured, or when it is deployed for consumer use.

The certificate can thus be used by the authentication system 116 as a secure means to verify in step 214 that the requesting STB 106 is a legitimate device managed by the service provider of the media system 112. If the device is not recognized, the authentication system 116 submits a failure notice to the SSS 114 which conveys this notice in whole or in part to the requesting STB 106, thereby indicating that the authentication process has failed. Thus the certificate can serve as a tool to prevent contraband STBs 106 from receiving multimedia services.

If the STB 106 is recognized as a legitimate device, the authentication system 116 proceeds to step 218 where it determines if the requesting STB 106 is a new device not previously used, or a reused STB. In the former use case, an entry in the database of the authentication system 116 can show a certificate and no associated IP address of an RG 106 since the STB has not been previously used. In the latter use case, there are three possibilities: (1) the STB remains with the same customer and is undergoing a power cycle in the same property (due to, for example, an electrical interruption in the property 102, (2) the STB 106 is being transferred by the same customer to another property 102, or (3) the STB is being transferred between customers to another property.

In the first case, the authentication system 116 detects a match between the IP address supplied by the requesting STB 106 and the IP address stored in the database of the authentication system 116. In this instance, the authentication system 116 can provide the SSS 114 in step 220 a message indicating that the STB 106 has been authenticated and that provisioning is not necessary. The SSS 114 in turn submits a notice to the requesting STB 106 indicating media services are enabled and it can proceed to present such services to end users in the property 102 via a corresponding media device 108 coupled thereto.

The last two scenarios can be identified by a mismatch between the IP address supplied by the requesting STB 106 and the authentication information stored in the authentication system 116. The mismatch can occur as a result of a customer submitting a request to an agent 110 to discontinue media services or to transfer media services to another property 102. Upon receiving a service update request such as this from the agent 110, the SOS 118 can be programmed to direct the authentication system 116 to remove the IP address stored in the database in relation to the affected STB 106. Other suitable alternative methods for detecting a mismatch or a need for provisioning the STB 106 can be applied to the operations of the authentication system 116. Once the authentication system 116 informs the SSS 114 that there is a need for provisioning, the SSS in step 222 submits a request to the SOS 118 for provisioning information for the requesting STB 106 according to the static IP address and certificate supplied by the STB 106.

In step 224, the SSS 114 receives the provisioning information from the SOS 118 and proceeds to direct the authentication system 116 to store said provisioning information in its database for future use if needed. The SSS 114 then provisions the STB 106 in step 226 with the provisioning information supplied by the SOS 118 and notifies the STB after completion of the provisioning process that it can proceed to process media services supplied by the media system 112. During the time that media services are enabled, the media system 112 in step 228 can be programmed to submit periodic tokens (e.g., every 8 hours) to the STB 106 for authentication purposes. The tokens are then utilized by the STB 106 in step 230 to maintain enablement of the media services by authenticating itself with the media system 112. The tokens can represent dynamic passwords that change over the course of time similar to devices used by computer users attempting to securely log into an enterprise system's IT network. Thus steps 228 and 230 provide a service provider of the media system 112 added security for preventing tampering and/or altering of STBs 106.

Method 200 as presently described provides service providers of media services an automated means to install STBs 106 in homes or commercial enterprises with minimal or no effort on the part of a customer or field technicians assigned to perform the installation. Method 200 further provides a means to perform the installation process under a secure method that helps to prevent tampering and counterfeits installation of STBs 106. Consequently, said method improves speed of installation and minimizes if not eliminates the possibility of identity theft, thereby reducing expenses for the service provider of the media system 112 which can benefit its consumers.

Upon reviewing the present disclosure, it would be evident to an artisan with ordinary skill in the art that the aforementioned embodiments can be modified, reduced, or enhanced without departing from the scope and spirit of the claims described below. For example, steps 228-230 of method 200 can be removed without affecting the scope of the present disclosure. Other present and future security techniques for generating certificates can be applied to the present disclosure for assisting in the prevention of identity theft for STBs 106.

It should be apparent by these examples that several modifications can be applied to the present disclosure without departing from the scope of the claims stated below. Accordingly, the reader is directed to the claims section for a fuller understanding of the breadth and scope of the present disclosure.

Figure 3:
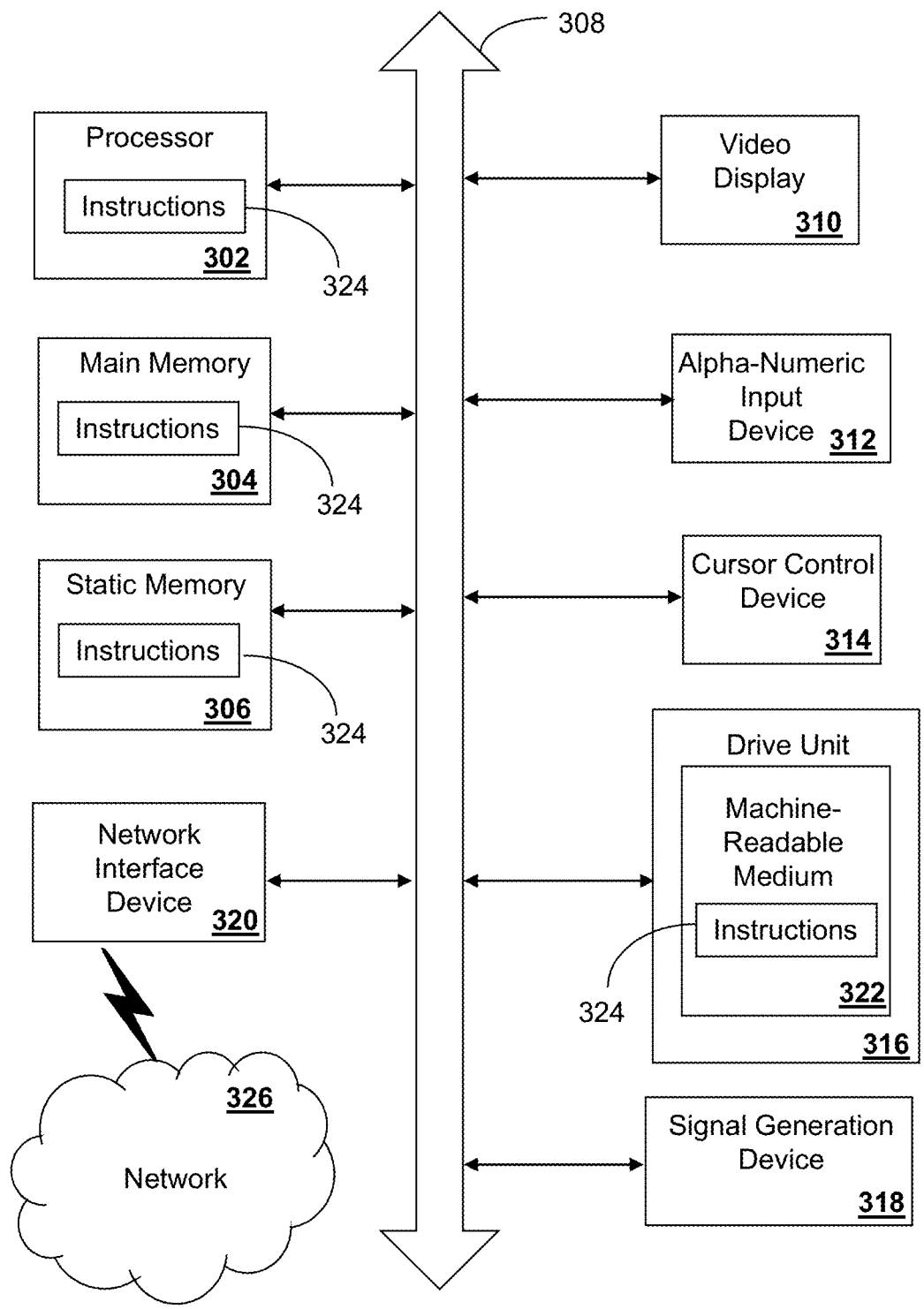
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A service startup system, comprising:
   a memory that stores instructions; and
   a controller element coupled to the memory, wherein responsive to executing the instructions, the controller element performs operations comprising:
      receiving from a set-top box an internet protocol address of a residential gateway, and a certificate associated with the set-top box for authenticating the set-top box and for provisioning the set-top box to enable reception of media services, the certificate comprising a public key infrastructure certificate uniquely created for and uniquely identifying the set-top box;
      submitting the internet protocol address of the residential gateway and the certificate of the set-top box to an authentication system for authenticating the set-top box,
         wherein the authentication system determines if the set-top box is a previously unused device or a reused device,
         wherein in accordance with detecting an entry in a database of the authentication system that includes the certificate and no associated internet protocol address of the residential gateway the authentication system determines that the set-top box is previously unused,
         wherein, in accordance with detecting an entry in the database that includes the certificate and a stored internet protocol address and detecting a match between the internet protocol address submitted by the set-top box to an internet protocol television system and the stored internet protocol address, the authentication system determines that the set-top box is being reused and undergoing a power cycle in a same property assigned to the residential gateway,
         wherein, in accordance with detecting an entry in the database that includes the certificate and a stored internet protocol address and detecting a mismatch between the internet protocol address submitted by the set-top box to the internet protocol television system and the stored internet protocol address, the authentication system determines that the set-top box is being reused and is being transferred to another property by a same customer or between customers, and
         wherein the set-top box is authenticated and provisioned without user input;
      submitting to the set-top box provisioning information supplied by a service orchestration system to enable presentation of the media services at a media device; and
      submitting to the set-top box a notice that the media services have been enabled after the provisioning information has been transferred to the set-top box.

2. The service startup system of claim 1, wherein the internet protocol address is assigned to the residential gateway to track its location.

3. The service startup system of claim 1, wherein the internet protocol television system comprises the authentication system or the service orchestration system.

4. The service startup system of claim 1, wherein the operations further comprise receiving an indication from the authentication system that the set-top box is recognized and requires provisioning.

5. The service startup system of claim 1, wherein the operations further comprise requesting from the service orchestration system the provisioning information for the set-top box.

6. The service startup system of claim 5, wherein the operations further comprise receiving the provisioning information requested from the service orchestration system.

7. The service startup system of claim 1, wherein the operations further comprise storing the provisioning information in the authentication system.

8. The service startup system of claim 1, wherein the operations further comprise receiving an indication from the authentication system that the set-top box is recognized and provisioned.

9. The service startup system of claim 1, wherein the authentication system stores authentication information of the set-top box according to a lightweight directory access protocol.

10. The service startup system of claim 1, wherein the residential gateway has a static internet protocol address comprising an internet protocol address or a media access control address.

11. The service startup system of claim 1, wherein the media services comprise digital media services or analog media services.

12. A service orchestration system, comprising:
    a memory that stores instructions; and
    a processor coupled to the memory, wherein responsive to executing the instructions, the processor performs operations comprising:
       receiving from a computing device a request for provisioning information for a media processor according to a static internet protocol address of a residential gateway and a certificate uniquely identifying the media processor, the certificate comprising a public key infrastructure certificate uniquely created for the media processor, and
       submitting the provisioning information to the computing device for provisioning the media processor to enable presentation of media services, wherein the request is generated in response to the media processor being authenticated by an authentication system according to the static internet protocol address of the residential gateway and the certificate of the media processor, wherein the authentication system determines if the media processor is a previously unused device or a reused device, wherein in accordance with detecting an entry in a database of the authentication system that includes the certificate and no associated internet protocol address of the residential gateway the authentication system determines that the media processor is previously unused, wherein, in accordance with detecting an entry in the database that includes the certificate and a stored internet protocol address and detecting a match between the internet protocol address submitted by the media processor to an internet protocol television system and the stored internet protocol address, the authentication system determines that the media processor is being reused and undergoing a power cycle in a same property assigned to the residential gateway, wherein, in accordance with detecting an entry in the database that includes the certificate and a stored internet protocol address and detecting a mismatch between the internet protocol address submitted by the media processor to the internet protocol television system and the stored internet protocol address, the authentication system determines that the media processor is being reused and is being transferred to another property by a same customer or between customers, wherein the media processor is authenticated and provisioned with the provisioning information without user input, wherein the computing device comprises a service startup system, and wherein the certificate comprises a unique identifier of the media processor.

13. The service orchestration system of claim 12, wherein the operations further comprise retrieving the provisioning information from a database according to the static internet protocol address of the residential gateway or the certificate of the media processor.

14. The service orchestration system of claim 12, wherein the media processor is authenticated by an authentication system that stores authentication information of the media processor according to a lightweight directory access protocol.

15. The service orchestration system of claim 12, wherein the certificate comprises a public key infrastructure certificate uniquely created for the media processor.

16. The service orchestration system of claim 12, wherein the media services comprise digital multimedia services or analog multimedia services.

17. A media device, comprising:
a memory that stores instructions; and
a controller element coupled to the memory, wherein responsive to executing the instructions, the controller element performs operations comprising:
receiving media services from a media processor enabled to deliver the media services upon being authenticated by an authentication system and provisioned according to a certificate that uniquely identifies the media processor and a static internet protocol address of a residential gateway, the certificate comprising a public key infrastructure certificate uniquely created for the media processor, wherein the authentication system determines if the media processor is a previously unused device or a reused device, wherein in accordance with detecting an entry in a database of the authentication system that includes the certificate and no associated internet protocol address of the residential gateway the authentication system determines that the media processor is previously unused, wherein, in accordance with detecting an entry in the database that includes the certificate and a stored internet protocol address and detecting a match between the internet protocol address submitted by the media processor to an internet protocol television system and the stored internet protocol address, the authentication system determines that the media processor is being reused and undergoing a power cycle in a same property assigned to the residential gateway, wherein, in accordance with detecting an entry in the database that includes the certificate and a stored internet protocol address and detecting a mismatch between the internet protocol address submitted by the media processor to the internet protocol television system and the stored internet protocol address, the authentication system determines that the media processor is being reused and is being transferred to another property by a same customer or between customers, wherein the media processor is authenticated and provisioned without user input, wherein the media processor is authenticated by the authentication system that stores authentication information of the media processor according to a lightweight directory access protocol, and wherein the certificate comprises a public key infrastructure certificate uniquely created for the media processor.

18. The media device of claim 17, wherein the media services comprise digital multimedia services or analog multimedia services.

19. The media device of claim 17, wherein the media services comprise internet protocol television services.

20. The media device of claim 17, wherein the media device comprises a television or a computing device.

* * * * *